3,153,681
METHOD FOR BLENDING FINELY DIVIDED POLYETHYLENE AND POLYPROPYLENE AND EXTRUDING THE MIXTURE AND THE PRODUCT FORMED THEREBY
Joseph Spotswood Anderson, Leon Walter Gamble, Webster Hallman Padgett, and Richard Louia Ray, all of Baton Rouge, La., assignors to Esso Research and Engineering Company, a corporation of Delaware
No Drawing. Filed Feb. 13, 1961, Ser. No. 88,671
8 Claims. (Cl. 260—897)

The present invention deals with forming blends of polypropylene and polyethylene having improved low temperature properties. More particularly, it deals with improving said polymer blends by utilizing polymer particles of less than 450 microns in diameter and subjecting the blend of selective size distribution to at least one extrusion step.

There has been increasing interest in using polypropylene, particularly low pressure polypropylene, as a plastic material for various applications. Low pressure polypropylene is prepared by the now well-known process of polymerizing propylene with a catalyst system made up of a reducible, heavy transition metal halide and a reducing metal-containing compound, i.e., titanium tetrachloride and triethyl aluminum, to give a high density, isotactic, high molecular weight, relatively linear polymer product. One of the difficulties in applying such polypropylene plastics has been their excessive brittleness at low temperatures, thus severely limiting their usefulness in such applications as packaging material for frozen foods, and wire and cable insulation. It has recently been suggested that the blending of polyethylene polymer with polypropylene would improve the low temperature properties of polypropylene. Polyethylene of various types, such as low pressure polyethylene produced by the Ziegler catalyst system described above, or a catalyst system such as described in U.S. Patent 3,032,513, filed October 10, 1958 (titanium tetrachloride treated with aluminum powder to form titanium chloride co-crystallized with aluminum halide which is thereafter activated with an organo-metallic reducing compound), have been used for this purpose.

It has now been found that further improvement in the low temperature properties of polypropylene-polyethylene blends can be obtained by forming and treating the blends in a highly specific manner. More particularly, it has been discovered that by forming blends having a particle size distribution of less than 450 microns in diameter, preferably less than 420 microns, and thereafter subjecting said polyethylene-polypropylene blends to at least one extrusion step, substantial improvements in low temperature properties, e.g., impact and Bell Brittleness temperature, are realized. Particularly outstanding results are obtained by utilizing a polyethylene-polypropylene blend of the above size distribution which has been subjected to at least two extrusion steps. As will be demonstrated in the present specification, the combination of utilizing a polyethylene-polypropylene blend which consists of particles of less than 450 microns in size and which has been subjected to at least one extrusion step, gives markedly better low temperature properties than:

(a) Polypropylene alone,
(b) Blends formed by simply mixing polyethylene and polypropylene, i.e., nonselective particle size distribution,
(c) Blends of nonselective particle size distribution which have been subjected to extrusion, and
(d) Blends of selected particle size distribution which have not been subjected to extrusion.

As produced by the conventional low pressure processes, polyethylene and polypropylene have a normal particle size distribution as shown below:

| Microns | Polyethylene percent | Polypropylene percent |
|---|---|---|
| 420 or greater | 5–10 | 10–40 |
| 150–400 | 30–50 | 25–50 |
| 75–100 | 30–40 | 20–50 |
| 44–75 | 10–20 | 5–10 |
| Less than 44 | 5–10 | Generally zero |

Thus a conventional blend of polyethylene and polypropylene would contain a substantial quantity of particles above 450 microns, particularly 420 microns, in size. For example, a blend of polyethylene and polypropylene in a ratio of 40 wt. percent polyethylene and 60 wt. percent polypropylene would have a typical particle size distribution as follows:

Microns: Blend (percent)
    420 or greater _____ 20–35
    150–420 _____ 30–50
    75–150 _____ 30–40
    44–75 _____ 10–15
    Less than 44 _____ 5–7

Thus, in order to obtain the select particle size distribution of the present invention, the polyethylene and polypropylene, either in separate steps or together, must be treated to obtain the proper particle size distribution. The selective sizing of the blend components and/or the blend itself may be carried out by any of a number of methods. The conventional polymer products of the polymerization processes may be screened by simple or complex means to obtain a fraction having particle sizes of less than 450 microns. Alternatively, the polymers may be reduced in size by ball milling, attrition milling, grinding, roller milling, etc., to reduce the size of the polymer particles to give the necessary size distribution. Of course these size reduction steps may be followed by one or more screening steps to give the proper blend particle size distribution. The blends themselves may be formed in any conventional manner, such as powder blending, solution blending, blending during the size reduction steps, simple tumbling mixing, or by a fluid-solids technique. The blending may conveniently be done after reducing the particle size of the individual polymer constituents.

The subsequent extrusion of the blend of selective particle size distribution is carried out by conventional extrusion techniques, such as described on pages 594 to 602 of "Polymers And Resins," Golding, D. Von Nostrand Co., Inc., 1959. The blend of select particle size distribution is dropped from a hopper into a cylinder where it is fused as it moves forward through a heating zone, a nozzle, and a die from which it emerges with a cross-section similar to that of the die. The extruded material may then be air cooled, allowed to cool naturally, or may be cooled more rapidly by immersion in water or other fluid. It may be diced or allowed to remain in extruded form. The extrusion may be effected by either a screw feed mechanism or a hydraulic ram. When employing screw extrusion, any of a number of differently designed screws may be employed. One wherein the compression ratio is at least 3:1, and more preferably 4:1, is preferred in order to obtain maximum mixing efficiency which is largely dependent on the depth of flight. Extrusion is carried out at a temperature in the range of 200° F. to 1000° F., preferably 250° F. to 600° F., and anywhere from 5 seconds to 60 minutes or more.

In a preferred embodiment, the blend, after being subjected to extrusion, is sent to a second extrusion treatment. The second extrusion step may merely take the form of recycling, after cooling, to the same extruder as used in the first step, or it may involve a second extrusion mechanism, usually operating in much the same manner as the first.

In another desirable embodiment, the fused polymer blend formed after one or more extrusions is allowed to age from several days to a month or more. The aging may be allowed to take place at room temperature or at somewhat elevated temperatures, e.g., up to the melting point of the blend constituents. This heat aging of the polymer blends tends to further improve their low temperature physical properties.

In general, the polymer blends prepared by the present method will contain a major portion of polypropylene and a minor portion of polyethylene, e.g., 55 to 90 wt. percent of the former and 10 to 45 wt. percent of the latter. While various polyethylenes can be employed, a polyethylene characterized by its extremely low degree of branching, i.e., less than 0.10 methyl groups per 100 carbon atoms, and low wt. percent unsaturation, i.e., less than 0.05, is preferred. In general, both the polyethylene and polypropylene will have a normal molecular weight range of 50,000 to 2,000,000, the polypropylene having a density of about 0.86 to 0.91 and a crystallinity from 50 to 96%. The polyethylene preferably has a density in the range of from 0.92 to 0.97.

All molecular weights recited in the present specification are viscosity average molecular weights. For polypropylene, the equation $[\eta] = 1.12 \times 10^{-4} \times M_\omega^{0.80}$ (tetralin solvent at 125° C.) was employed. Polyethylene molecular weight was in accordance with J. Poly. Sci. 31, 453 (1958) using decalin at 135° C.

The various aspects and modifications of the present invention will be made more clearly apparent by reference to the following description and accompanying examples.

EXAMPLES 1 AND 2

A low pressure polypropylene having a density of about 0.9030 and a crystallinity of about 90% was to be blended with a polyethylene having a density of 0.9450 and a molecular weight of about 1,200,000 in the ratio of 60 wt. percent of the former to 40 wt. percent of the latter. The polyethylene was prepared from a catalyst system of titanium chloride co-crystallized with aluminum halide via the reaction of aluminum powder with titanium tetrachloride. The polypropylene and polyethylene were individually screened through a 65 mesh U.S. Standard Screen (about 230 microns) and the material passing through the screen, i.e., 230 microns or less, was blended together in a 60 wt. percent polypropylene and a 40 wt. percent polyethylene ratio. Blending was accomplished by simple dry blending in a rotary coniform blender. This same blend would have had the following particle size distribution if no screening had been employed.

Microns:     Blend (percent)
420 or greater _____ 20–35
150–420 _____ 30–50
75–150 _____ 30–40
44–75 _____ 10–15
Less than 44 _____ 5–7

One portion of the blend of selective size distribution was simply molded into test bars. The remainder of the blend of selective particle size distribution was subjected to a conventional extrusion step. The extrusion operation took place at a temperature of about 400° F. using a Hartig 3¼ inch commercial extruder. Extrusion residence time was about 0.1 to 1.0 minute using a screw having a compression ratio of about 4 to 1. After extrusion, this portion of the blend was subjected to cooling by means of a water bath.

A portion of the extruded material was subjected to a second extrusion step via running the cooled extruded product of the first extrusion step, after dicing, to the same extruder for a second extrusion operation under substantially the same conditions as the first.

Polymer blends prepared in accordance with the above procedure were then molded into test bars and tested for Bell Brittleness temperature in accordance with ASTM Test D–746. The results are shown in Table I.

*Table I*

| | Test Values | | |
|---|---|---|---|
| | Powder Blend | Powder Blend + 1 Extrusion | Powder Blend + 2 Extrusions |
| Bell Brittleness Temperature, °F.. | +6 | −63 | −83 |

As shown above, a blend of selective particle size distribution which was extruded gave especially excellent low Bell Brittleness temperature and had substantially better brittleness temperature properties than a blend which had not been extruded. Further, the data illustrate that by subjecting a blend of selective particle size distribution to at least two extrusions, even better Bell Brittleness temperature properties can be realized.

EXAMPLES 3 AND 4

To further illustrate the advantages afforded by the present blending method, the following experimental tests are set forth.

A low pressure polypropylene polymer having a molecular weight of approximately 540,000, a density of about 0.9050, and a crystallinity of 92% was tested for its low temperature impact properties when treated in various ways. Test bars were prepared from the polypropylene in the following manner:

(1) The polypropylene was used alone and neither screened nor extruded. The polypropylene contained 20 wt. percent particles of 450 microns or larger.

(2) The polypropylene was blended in the ratio of 60 to 40 wt. percent with a polyethylene having a density of 0.9450 and a molecular weight of 1,100,000. The blend had a particle size distribution similar to the unscreened polymer blend of Examples 1 and 2. A portion of the resulting blend was directly molded into test bars.

(3) A portion of the unscreened blend of item (2) was subjected to an extrusion step. Extrusion was carried out at a temperature of 420° F. and for a period of 1.2 minutes by means of a Hartig 3¼ inch extruder having a compression ratio of about 4 to 1.

(4) The same polypropylene and polyethylene as employed in items (2) and (3) were blended in the same ratio, i.e., 60 to 40 wt. percent but only after subjecting each of the polymer constituents to screening through a 40 mesh screen to obtain a particle size fraction of 420 microns and less diameter. The screened polypropylene and polyethylene polymers were then blended by simple powder mixing to form a blend having particle sizes of less than 420 microns. The resulting blend of selective particle size distribution was then extruded in the same manner as described in item (3) and the extruded material molded into test bars.

(5) A portion of the extruded material of the blend of selective particle size distribution of item (4) was subjected to a second extrusion. The second extrusion step took place at a temperature of 420° F. for a period of 0.8 minute by means of a screw extruded having a compression ratio of about 4 to 1.

(6) A portion of the unscreened blend of item (3) which had been subjected to one extrusion was subjected to a second extrusion in the same manner as the blend of item (5).

The blends treated in the above manner were tested for impact resistance in accordance with ASTM Test- 256-Izod-type test at a temperature of −120° F. The blends exhibited the following low temperature properties:

*Table II*

| Sample tested: | Izod impact (unnotched, ft. lbs./in.) −120° F. |
|---|---|
| Polypropylene alone | 3 |
| Unscreened polypropylene-polyethylene blend (no extrusion) | 13 |
| Unscreened blend subjected to one extrusion | 9.3 |
| Screened blend of less than 420 microns subjected to one extrusion | 26.4 |
| Screened blend of less than 420 microns subjected to two extrusions [1] | >64 |

[1] Unscreened blend subjected to two extrusions had an impact of only 23 ft. lbs./in.

As shown in Table II, by utilizing a blend of selective particle size distribution which has been subjected to at least one extrusion step, polypropylene plastics exhibit greatly improved low temperature impact resistance. In this manner substantially better results are realized than when (a) employing polypropylene alone, or (b) polypropylene-polyethylene blends of nonselective particle size distribution which have or have not been subjected to extrusion.

As shown above, extremely good results are obtained by subjecting a blend of selective particle size distribution to at least two extrusion steps.

The advantages afforded by the present invention become readily apparent. By blending polyethylene and polypropylene in the present manner, blends of extremely good low temperature properties are obtained, making polypropylene plastics practical for numerous conventional and specialty uses. Substantially better properties can thus be obtained as compared with other techniques for incorporation of polyethylene in polypropylene compounds.

Various modifications may be made to the present invention. For example, additional additives such as dopes, pigments, stabilizers, inhibitors, etc., may be present in the polypropylene-polyethylene blend.

It is to be clearly understood that the specific examples set forth are merely illustrative of the present method and do not limit the invention to the specific extrusion process employed therein.

Having described the present invention, that which is sought to be protected is set forth in the following claims.

What is claimed is:

1. In a method for preparing a blend of 55 to 90 wt. percent polypropylene with 10 to 45 wt. percent polyethylene, the improvement which comprises forming a blend having a particle size distribution of less than 450 microns and thereafter extruding said blend.

2. The improvement of claim 1 wherein said blend has a particle size distribution of less than 420 microns.

3. The improvement of claim 1 wherein said polypropylene and polyethylene are screened prior to blending so as to initially obtain polypropylene and polyethylene particles having a size distribution of less than 450 microns.

4. In a method for preparing a blend of 55 to 90 wt. percent polypropylene with 10 to 45 wt. percent polyethylene, the improvement which comprises blending polypropylene particles having a crystallinity of 50 to 96%, a density of 0.86 to 0.91 and a particle size distribution of less than 450 microns with polyethylene particles having a degree of branching corresponding to less than 0.10 methyl groups per 100 carbon atoms, a density of 0.92 to 0.97 and a particle size distribution of less than 450 microns, and thereafter extruding said blend.

5. The improvement of claim 4 wherein the particle size distribution is obtained by screening the particles to remove particles having a size of greater than 450 microns.

6. The improvement of claim 4 wherein the particles have a size distribution of less than 420 microns.

7. The improvement of claim 1 wherein the blend having a particle size distribution of less than 450 microns is extruded twice.

8. The improvement of claim 4 wherein said extrusion is carried out by means of a screw having a compression ratio of at least 3:1.

References Cited in the file of this patent

UNITED STATES PATENTS

| 2,791,576 | Field et al. | May 7, 1957 |
| 2,882,263 | Natta et al. | Apr. 14, 1959 |
| 2,956,042 | Underwood et al. | Oct. 11, 1960 |

OTHER REFERENCES

Modern Plastic Encyclopedia (1955), pages 540, 541, 542, 544, and 546 (page 540 relied upon).

Perry: Chemical Engineers' Handbook, Third Edition (1950), McGraw-Hill Book Co. Inc., pages 1181–3 (page 1182 relied upon).